United States Patent
Faller et al.

(10) Patent No.: US 10,525,954 B2
(45) Date of Patent: Jan. 7, 2020

(54) PNEUMATIC BRAKE BOOSTER HAVING A CONNECTING PIN

(71) Applicant: Continental Teves AG & Co. oHG, Frankfurt (DE)

(72) Inventors: Jürgen Faller, Kahl (DE); Oliver Herke, Frankfurt (DE); Rene Peter Eberhart, Oberursel (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 36 days.

(21) Appl. No.: 15/736,861

(22) PCT Filed: Jun. 21, 2016

(86) PCT No.: PCT/EP2016/064273
§ 371 (c)(1),
(2) Date: Dec. 15, 2017

(87) PCT Pub. No.: WO2017/001237
PCT Pub. Date: Jan. 5, 2017

(65) Prior Publication Data
US 2018/0362007 A1 Dec. 20, 2018

(30) Foreign Application Priority Data
Jun. 29, 2015 (DE) .................. 10 2015 212 089

(51) Int. Cl.
*B60T 13/567* (2006.01)
*B60T 13/573* (2006.01)

(52) U.S. Cl.
CPC ........ *B60T 13/5675* (2013.01); *B60T 13/573* (2013.01)

(58) Field of Classification Search
CPC .................................................. B60T 13/5675
See application file for complete search history.

(56) References Cited

U.S. PATENT DOCUMENTS 6,314,865 B1 * 11/2001 Henein ............... B60T 13/5675
92/169.3
6,651,548 B1   11/2003 Faller
(Continued)

FOREIGN PATENT DOCUMENTS

EP     1870306 A1    12/2007
EP     2058195 A1     5/2009
(Continued)

OTHER PUBLICATIONS

International Search Report and Written Opinion for International Application No. PCT/EP2016/064273, dated Sep. 16, 2016, 10 pages.

*Primary Examiner* — Michael Leslie
(74) *Attorney, Agent, or Firm* — RatnerPrestia

(57) ABSTRACT

A pneumatic brake booster for a hydraulic motor-vehicle brake system, including a booster housing, having a front and a rear housing shell, and at least one connecting pin, which is arranged in the booster housing such that the at least one connecting pin extends axially parallel to the center axis and which supports the booster housing from the inside by two supporting formations and which protrudes through the booster housing from the inside to the outside on at least one side by an end segment. In order to ensure simple intermediate handling of the brake booster before and during the assembly of the brake system and to improve the durability and corrosion resistance, the housing shells are arranged in such a way that the housing shells are each connected to the connecting pin such that the housing shells are secured against being axially moved apart from each other.

5 Claims, 4 Drawing Sheets

(56) References Cited

U.S. PATENT DOCUMENTS

| | | | |
|---|---|---|---|
| 7,318,370 B2 * | 1/2008 | Samson | B60T 13/5675 91/376 R |
| 7,322,269 B2 | 1/2008 | Faller et al. | |
| 7,673,554 B2 * | 3/2010 | Raimbault | B60T 13/5675 91/376 R |
| 2013/0145927 A1 * | 6/2013 | Giese | B60T 13/5675 91/368 |
| 2014/0373709 A1 * | 12/2014 | Yasui | B60T 13/5675 91/368 |

FOREIGN PATENT DOCUMENTS

| | | |
|---|---|---|
| EP | 2072362 A1 | 6/2009 |
| GB | 2025549 A | 1/1980 |
| WO | 0061416 A1 | 10/2000 |
| WO | 2004101341 A2 | 11/2004 |

* cited by examiner a)

b)

a)

b) B-B a)

b)

a)

b)

PNEUMATIC BRAKE BOOSTER HAVING A CONNECTING PIN

CROSS REFERENCE TO RELATED APPLICATIONS

This application is the U.S. National Phase Application of PCT International Application No. PCT/EP2016/064273, filed Jun. 21, 2016, which claims priority to German Patent Application No. 10 2015 212 089.9, filed Jun. 29, 2015, the contents of such applications being incorporated by reference herein.

FIELD OF THE INVENTION

The invention relates to a pneumatic brake booster for a hydraulic motor vehicle brake system.

BACKGROUND OF THE INVENTION

Such brake boosters are widespread and are known, for example, from WO0061416A1, which is incorporated by reference or WO2004101341A2, which is incorporated by reference.

The booster housing of such brake boosters usually comprises two cup-shaped housing shells which are arranged in series along a brake booster central axis.

Brake boosters of the generic type have connecting pins which are arranged in the booster housing in an axis-parallel fashion with respect to the central axis and project through the booster housing with at least one end section, but usually with both end sections, from the inside to the outside. At these end sections of the connecting pins, master brake cylinders are then mounted and/or the brake booster is attached to the vehicle, with the result that during operation the booster housing is clamped in inside a brake system between the vehicle and the master brake cylinder.

During operation, a vacuum is present in the interior of the booster housing, with the result that the housing shells are pressed one against the other. In order to prevent the generally thin-walled booster housing from collapsing or imploding owing to the vacuum, two supporting formations are arranged on the connecting pin, which supporting formations support the booster housing from the inside—each supporting formation one of the housing shells.

For functional reasons, a restoring spring is arranged in the interior of the booster housing and acts with a prestressing force against the two housing shells. In order to prevent the brake booster from falling apart during its handling, transportation, despatching and the like up to the mounting of the master brake cylinder and/or mounting in the vehicle, the housing shells must be held together. In order, in this context, to avoid using separate, additional transportation securing devices, which have to be removed before the final mounting, it is known to connect the housing shells securely to one another at their radial outer edge. For this purpose, clips on one of the housing shells are often bent or positioned around a radial edge or band on another housing shell. This ensures that the prestressing force of the clamped restoring spring is received at the radial outer edge of the booster housing, and the housing shells are not pushed apart.

For the positioning of such clips, tools are required which ineffectively take up a large amount of space. In addition, in the case of surface-coated housing shells the surface coating or other protective coating is often damaged by the positioning of clips. This can lead during operation of the brake booster in the vehicle to undesired corrosion on the booster housing.

SUMMARY OF THE INVENTION

An aspect of the invention is based on providing an improved brake booster with reduced disadvantages compared to the known prior art.

According to an aspect of the invention, any housing shell can be respectively connected to the connecting pin, with the result that they are prevented from shifting axially outward on the connecting pin.

The prestressing force of a restoring spring in the booster housing is applied to the connecting pin, which is tension-resistant in any case, with the result that it is possible to dispense with an additional connection or coupling of the housing shells at their radial outer edge.

As a result, it is no longer necessary to provide or position clips, the risk of damage to the protective coating is avoided, the corrosion in the outer area is reduced, and the durability is improved as a result.

The housing shell can be configured more simply and more economically, and the external design of the booster housing can also be improved.

The connection according to an aspect of the invention between a housing shell and the connecting pin can preferably comprise at least one form fit, which improves the durability, simplifies the mounting and avoids mounting errors through unambiguous detection of incorrect mounting.

One particularly preferred embodiment according to an aspect of the invention provides that the connection comprises at least one latching connection, by which means the housing shell can be mounted securely in a particularly simple and fast fashion with a high cycle rate and without an additional tool.

In one development of the invention, a radially elastic formation can be provided on a housing shell for generating the latching connection, which elastic formation is latched in to an axial undercut on the connecting pin. The formation can be constructed in different embodiments according to the invention here, for example as a conical collar which surrounds the connecting pin radially and is slotted axially, or at least one spring clip which is inclined radially with respect to the longitudinal axis of the connecting pin.

A further embodiment according to an aspect of the invention provides that the form fit is generated by shaping a section of the housing shell after it has been mounted on the connecting pin. As a result, a particularly secure and durable connection can be produced using relatively simple and cost-effective tools.

In different developments, the form fit which is produced by shaping technology can be generated by means of a tubular, axial projection which engages radially around the connecting pin and on which a shapeable section is partially pressed into an axial undercut on the connecting pin.

The form fit can also be generated by partial shaping of the connecting pin after a housing shell has been mounted, for example by launching in that the material of the connecting pin is scraped away from its surface and raised or compressed before the housing shell. In this way, a particularly compact connection can be generated and the housing shell can be configured in a very simple way in the region which connects to the connecting pin.

In another embodiment according to an aspect of the invention, the form fit can also be formed by an additional, separate locking element which is mounted outside the booster housing.

In different developments, the locking element can be embodied in a radially elastic fashion here and clipped onto an axial undercut on the connecting pin, for example as a snap ring or retaining ring or it can even be embodied as a separate screw element which is attached to a thread on the connecting pin and supports the housing shell from the outside before further assemblies are mounted on the connecting pin.

This way, a repair-friendly, reversibly releasable connection is possible which permits destruction-free disassembly of the booster housing.

In a further embodiment according to an aspect of the invention, the locking element can be embodied as a sleeve which is fitted onto the connecting pin and is partially pressed into an axial undercut on the connecting pin. The sleeve can be composed here of a cost-effective and rust-proof material, for example aluminum.

As a result, a permanently secure and corrosion-reduced connection can be produced, and the housing shell can be configured in a particularly simple way, in particular in the region of the opening for the connecting pin.

As a result of the inventive securement of the housing shells to the connecting pin, in one development according to the invention the housing shells can be configured loosely decoupled from one another at their radially outer edge sections.

In a further development, the housing shells can be moved into abutment in the axial direction with respect to one another, at their radially outer edge sections, in order to provide better support against vacuum forces during braking operation.

Tools for producing the housing shell are as a result considerably simplified and the production costs and materials required are reduced. Because there is no direct contact between the metallic housing shells, or said contact is at least highly reduced, the transmission of noise is also reduced.

Secure transportation and simplified handling of the brake booster are nevertheless ensured, since the booster housing is held together securely at the connecting pin.

BRIEF DESCRIPTION OF THE DRAWINGS

An aspect of the invention will be explained in more detail below. In this context, the description of generally known aspects and functions of a brake booster of the generic type will be largely dispensed with, and only details which are relevant to the invention will be given. It is also to be noted that the invention can be applied both to a single brake booster and to a tandem brake booster.

In particular.

DETAILED DESCRIPTION OF THE PREFERRED EMBODIMENTS

Figure 1:
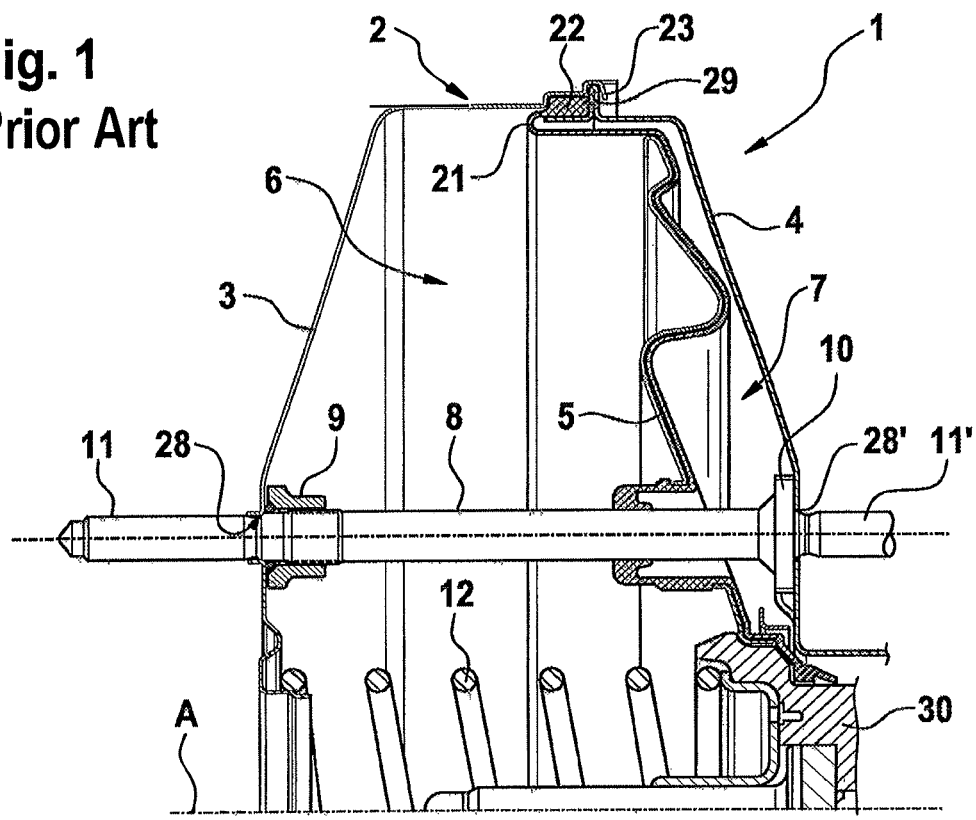
FIG. 1 shows a partial view of a known embodiment of a brake booster of the generic type, in a sectional illustration.

FIG. 1 shows a partial view of a known embodiment of a pneumatic brake booster 1 of the generic type.

The booster housing 2 comprises a front housing shell 3 and a rear housing shell 4 which are arranged in series along a central axis A. A working wall 5 is shifted to limited extent along the central axis A, which working wall separates a vacuum chamber 6 from a working chamber 7. For the purpose of sealing the vacuum chamber 6 off from the working chamber 7, a rolling diaphragm 21 is applied partially to the working wall 5. A sealing bead 22, which is clamped in axially and radially between the housing shells 3, 4 is formed onto the radial outer edge of the rolling diaphragm 21, which sealing bead 22 serves to seal the booster housing 2 with respect to the surroundings and to secure the rolling diaphragm 21.

A connecting pin 8 is arranged axis-parallel with respect to the central axis A in the booster housing 2. In the embodiment shown, the connecting pin 8 projects with its end sections 11, 11' through the booster housing 2 from the inside to the outside, through the openings 28, 28' in the housing shells 3, 4.

The ends 11, 11' are used for later mounting of the brake booster 1 on the vehicle and for mounting a master brake cylinder (not shown) on the brake booster 1, and are usually provided with threads.

In order to support the booster housing 2 against imploding or collapsing owing to vacuum forces, two supporting formations 9 and 10 are arranged on the connecting pin 8, said supporting formations 9 and 10 supporting the booster housing 2 from the inside.

A restoring spring 12 is clamped in the booster housing 2 and acts with its prestressing force on the two housing shells 3 and 4 from the inside. The restoring spring 12 is used essentially to reset a control housing 30 after a braking process, into its initial position which is shown here.

So that the booster housing 2 does not fall apart before a master brake cylinder is mounted and before the brake booster 1 is mounted on the vehicle, by virtue of the prestressing force of the restoring spring and the general handling, and all the components remain at the positions provided, clips 23 which are distributed radially on the outside of the circumference of the front housing shell 3 are placed around a collar 29 which runs all around and is folded in the embodiment shown on the rear housing shell 4, with the result that the housing shells 3 and 4 cannot be pushed axially apart from one another.

Figure 2:
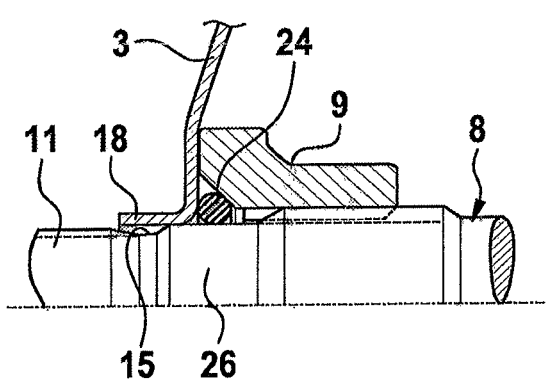
FIG. 2 shows a view of a detail of a connection, generated by shaping technology, between a housing shell and a connecting pin of a first embodiment according to an aspect of the invention before a) and the shaping b).
Figure 2:
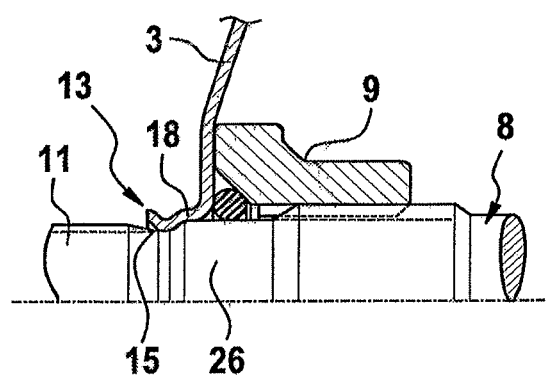

FIG. 2 shows a view of a detail of a first embodiment according to an aspect of the invention with a form fit 13 which is generated by shaping technology between a housing shell 3 and the connecting pin 8. In view a) the state is shown before the shaping, and in view b) the final state after the shaping is shown.

An axially projecting tubular projection 18, which encloses with its wall the connecting pin 8 closely in a radial direction is formed on the housing shell 3. The connecting pin 8 has, in the section enclosed by the projection 18, and undercut 15 which acts axially in the direction of the adjacent end section 11 of the connecting pin 8. According to an aspect of the invention, the undercut 15 can be provided as a circumferential groove or else, in an embodiment not shown here, as a relief groove, step or any other change in the external diameter on the connecting pin 8 between the sealing region 26 and the thread on the end section 11.

After the housing shell 3 has been fitted onto the connecting pin 8, the projection 18 is partially shaped, and in the process pressed into the undercut 15, with the result that a form fit 13 is produced which preferably acts in both axial directions, but at least in the direction of the adjacent end section 11 of the connecting pin 8.

The spring force of the restoring spring 12 (shown in FIG. 1) is applied by the housing shell 3 directly into the connecting pin 8 via the form fit 13. The possibility of axial shifting of the housing shell 3 toward the outside, in this case toward the adjacent end section 11 of the connecting pin 8, is generally prevented. Instead, the housing shell 3 is clamped in between the form fit 13 and the supporting formation 9, and is therefore held tight in a defined axial position on the connecting pin 8.

Figure 3:
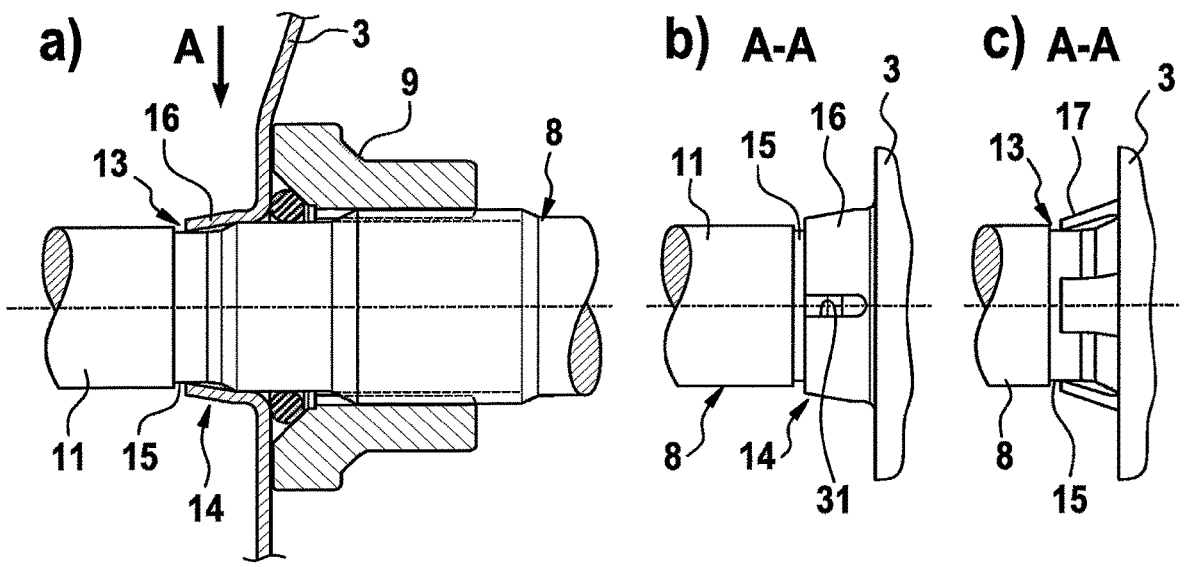
FIG. 3 shows a view of a detail of a latched connection between a housing shell and a connecting pin of two further embodiments according to an aspect of the invention, in section a) as well as plan views of embodiments with a collar b) and spring clips c).

FIG. 3 shows a view of a detail of a further embodiment according to an aspect of the invention. The connection between the connecting pin 8 and the housing shell 3 is also embodied in a form-fitting fashion with a form fit 13 which acts axially in the direction of the end section 11 of the connecting pin 8, but in contrast to the embodiment according to FIG. 2 is embodied as a latched connection. For this purpose, the housing shell 3 has a formation 14 which is elastic in the radial direction and essentially rigid in the axial direction and latches automatically into the axial undercut 15 on the connecting pin 8 when the housing shell 3 is fitted onto the connecting pin 8.

The views b) and c) show by way of example two different embodiments of the latched connection. In the embodiment in view b), an axially slotted, conical collar 16, which runs radially around the connecting pin 8, is formed on the housing shell 3. The smaller diameter on the cone is made to be smaller than the external diameter of the end section 11 of the connecting pin 8. The axial slot 31, of which a plurality of, preferably 3, can be distributed on the circumference of the collar, permits elastic widening of the collar 16, as a result of which it can be fitted over the end section 11 of the connecting pin 8 without plastic deformation or damage.

In the embodiment in view c), a plurality of individual spring clips 17, inclined away from the horizontal in the direction of the connecting pin 8, are formed on the housing shell 3, instead of a slotted collar 16, which spring clips are clipped in elastically into the axial undercut 15 on the connecting pin 8 with their respective end sections to form the form fit 13.

Figure 4:
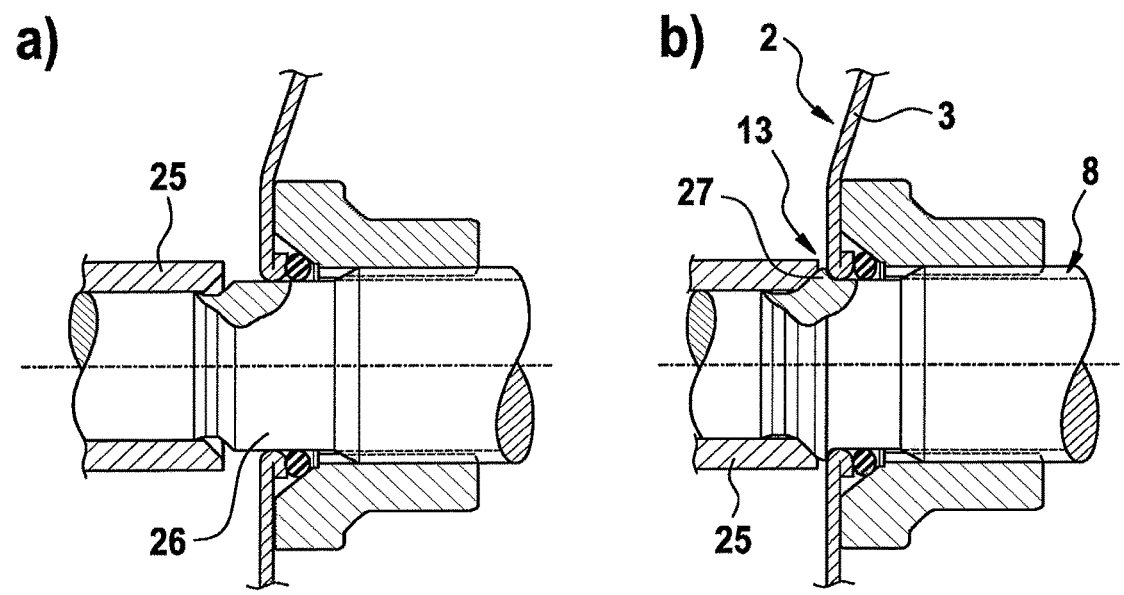
FIG. 4 shows a view of a detail of a further connection according to an aspect of the invention, generated by shaping technology, between a housing shell and a connecting pin of a first embodiment according to the invention before a) and the shaping b).

In a further embodiment according to an aspect of the invention in FIG. 4, the form fit 13 is generated by shaping the connecting pin 8 after the housing shell 3 has been mounted. The view a) shows the state before, and the view b) shows the state after the shaping.

The material of the connecting pin 8 is forced from its original position on the stem of the connecting pin 8 axially through the tool 25 in the direction of the housing shell 3 and is raised and compressed before the latter.

In a tubular tool 25 which is shown, a circumferential bead 27 is produced on the connecting pin 8 here. When a tool (not shown) is used with individual lancers instead of an annular working edge, individual elevated portions, which are distributed radially along circumference, but which do not produce the same effect, are correspondingly generated on the connecting pin 8 instead of a radially circumferential bead 27. Such a joining method is also referred to as lancing.

In further embodiments according to an aspect of the invention, the form fit 13 is generated by means of an additional, separate locking element 19, which is mounted on the connecting pin 8.

Figure 5:
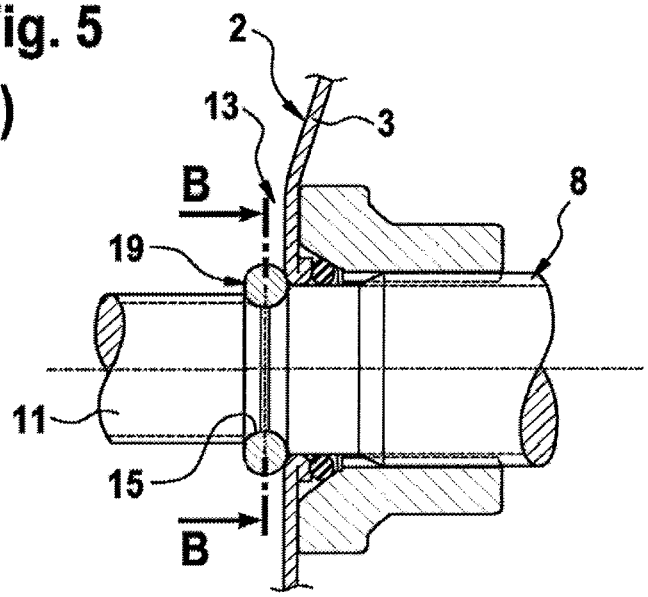
FIG. 5 shows a view of a detail of the connection between a housing shell and the connecting pin of another embodiment according to an aspect of the invention, having a radially elastic locking element on the connecting pin, in a side view a) and sectional end view b).
Figure 5:
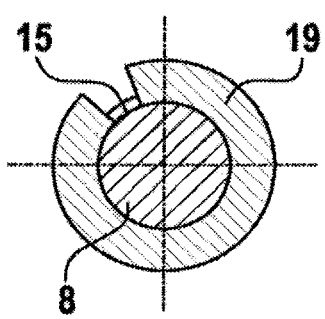

In the embodiment according to FIG. 5, the locking element 19 is configured in an elastically sprung fashion in the radial direction and is clipped indirectly before the housing shell 3 in an axial undercut 15 on the connecting pin 8. Snap rings-retaining rings or further, in particular standard components with a comparable functionality are suitable as such locking elements.

Because, during subsequent mounting processes, this location is covered by a flange of a master brake cylinder or a sheet metal wall of the vehicle, a loss protection of the locking element during operation of the vehicle which is subject to vibrations is ensured.

Figure 6:
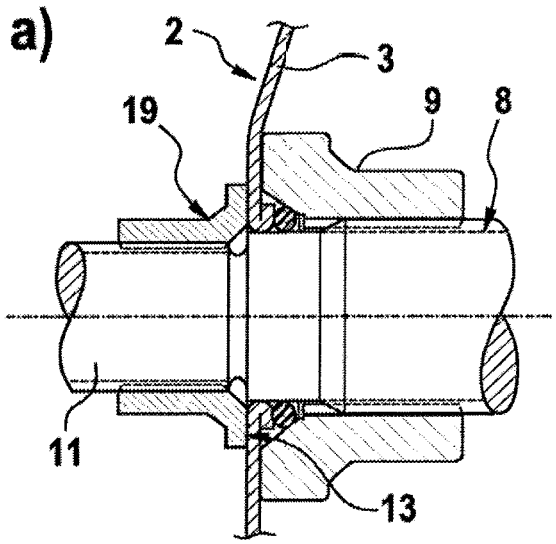
FIG. 6 shows a view of a detail of the connection between a housing shell and the connecting pin of a further embodiment according to an aspect of the invention, having a screwed locking element in two different embodiments a) and b).
Figure 6:
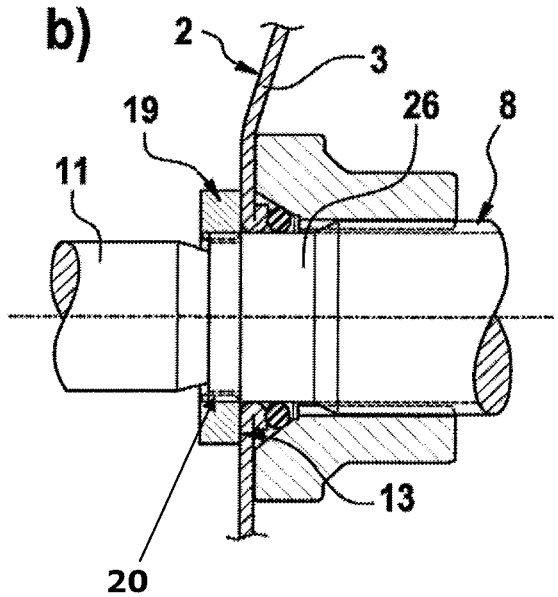

The locking element 19 in the embodiment according to FIG. 6 is embodied as a screw element, which is screwed onto a thread 20 on the connecting pin 8, and therefore forms a form fit with the housing shell 3.

In the view a) the locking element 19 is configured as a threaded sleeve which is screwed onto the thread 20, the thread 20 is arranged here on the end section 11 of the connecting pin 8 and can also be used, for example, for mounting a master brake cylinder.

In the embodiment in view b) the locking element 19 is provided as a nut, and the thread 20 is attached to a section of the connecting pin 8 which is directly adjacent to the sealing region 26.

Figure 7:
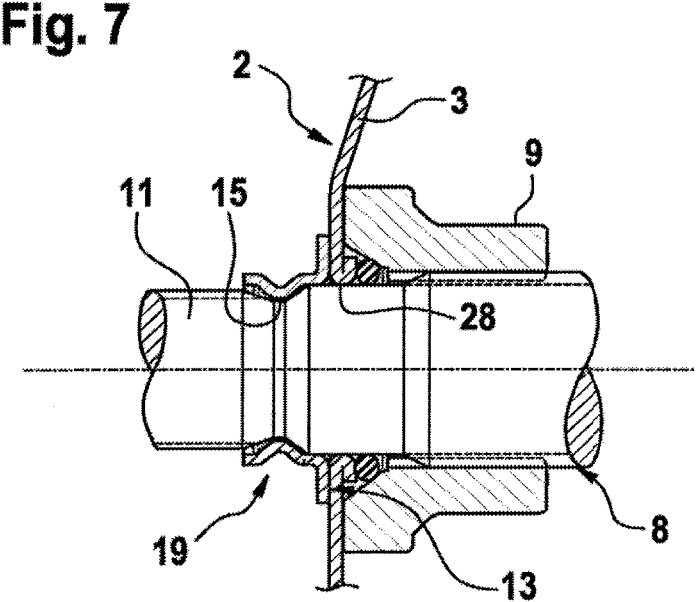
FIG. 7 shows a view of a detail of the connection between a housing shell and the connecting pin of a further embodiment according to an aspect of the invention, having a locking element which is secured by shaping technology.

In another embodiment according to an aspect of the invention in FIG. 7, the locking element 19 is configured as a cylindrical sleeve 19 with a circumferential band or collar. After the housing shell 3 has been mounted onto the connecting pin 8, the sleeve 20 is fitted on as far as abutment against the housing shell 3, and then a region of the tubular body of the sleeve 20, equivalent to the process described in FIG. 2, is pressed or forced into an axial undercut 15 on the connecting pin 8.

Figure 8:
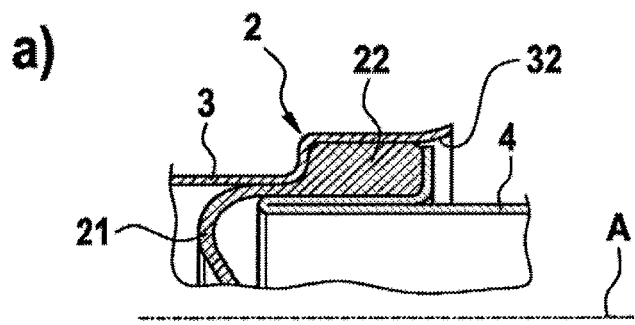
FIG. 8 shows views of a detail of the radially outer approximation section of the housing shells of a brake booster according to an aspect of the invention in a completely uncoupled embodiment a) and with an axial abutment b).
Figure 8:
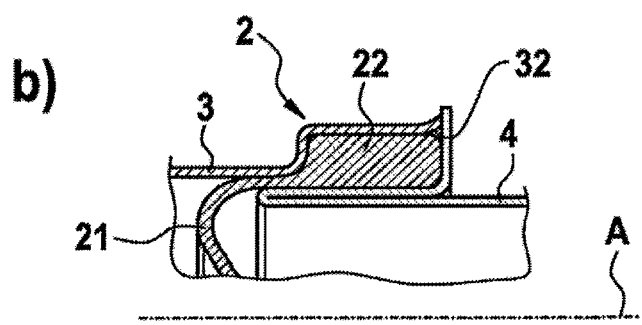

In FIG. 8, two different developments of an embodiment according to an aspect of the invention of the brake booster 1, as described above, is shown in views a) and b).

The views show the radial outer section of the booster housing 2 in the region of the approximation of the housing shells 3 and 4.

The sealing bead 22 of the rolling diaphragms 21 is clamped in both radially and axially between the two housing shells 3 and 4. In contrast to the known embodiment according to FIG. 1, the clip 23 is not present here, since a connection or coupling of the two housing shells 3 and 4 in the direction of one another as well as in an axis-parallel fashion with respect to the central axis A is no longer necessary.

In the embodiment according to the view a) the housing shells 3 and 4 are arranged loosely, having been entirely uncoupled from one another.

The sealing bead 22 seals radially between the two housing shells 3 and 4, and additionally takes up the axial forces which are produced within the booster housing 2 owing to the changes in pressure during operation of the brakes.

An insertion slope 32 on the housing shell 3 serves for simplified mounting of the sealing beads 22 and of the housing shell 4.

In the embodiment according to the view b), the housing shells 3 and 4 are arranged in abutment with respect to one another, wherein the abutment acts merely to provide mutual support of the two housing shells 3 and 4 in the axial direction with respect to one another, in order to increase the rigidity of the booster housing 2 with respect to axial forces which are produced during operation by the vacuum in the interior of the booster housing 2.

LIST OF REFERENCE SIGNS

1 Brake booster
2 Booster housing
3 Housing shell
4 Housing shell
5 Working wall
6 Vacuum chamber
7 Working chamber
8 Connecting pin
9 Supporting formation
10 Supporting formation
11 End section
12 Restoring spring
13 Form fit
14 Radially elastic formation
15 Axial undercut
16 Collar
17 Spring clip
18 Projection
19 Locking element
20 Sleeve
21 Rolling diaphragm
22 Sealing bead
23 Clip
24 Sealing ring
25 Tool
26 Sealing region
27 Elevation
28 Opening
29 Band
30 Control housing
31 Slot
32 Insertion slope
A Central axis

The invention claimed is:

1. A pneumatic brake booster for a hydraulic motor vehicle brake system, having a booster housing which comprises a front housing shell and a rear housing shell, which are arranged in series along a central axis, having at least one connecting pin which is arranged extending axially in the booster housing in an axis-parallel fashion with respect to the central axis, supports the booster housing from the inside by two supporting formations, and projects with an end section through the booster housing from the inside to the outside on at least one side, wherein the housing shells are arranged such that they are each connected to the connecting pin in order to secure them against being pushed apart relatively in an axial direction,
wherein the connection comprises at least one latching connection,
wherein at least one of the front housing shell and the rear housing shell has a radially elastic formation which is latched in at an axial undercut on the connecting pin, and
wherein the formation is embodied as a conical collar which surrounds the connecting pin radially and is slotted axially, or at least one spring clip which is inclined radially with respect to the longitudinal axis of the connecting pin.

2. The brake booster as claimed in claim 1, wherein a restoring spring is arranged in the booster housing such that the restoring spring is axially prestressed with a prestressing force, and the connection between the connecting pin and the housing shell is configured to apply the prestressing force in the connecting pin.

3. The brake booster as claimed in claim 1, wherein the housing shells are loosely uncoupled from one another and apart in the axial direction, at their radially outer edge sections.

4. The brake booster as claimed in claim 3, wherein the housing shells are arranged in such a way that they are moved into abutment in the axial direction with respect to one another, at their radially outer edge sections.

5. A pneumatic brake booster for a hydraulic motor vehicle brake system, having a booster housing which comprises a front housing shell and a rear housing shell, which are arranged in series along a central axis, having at least one connecting pin which is arranged extending axially in the booster housing in an axis-parallel fashion with respect to the central axis, supports the booster housing from the inside by two supporting formations, and projects with an end section through the booster housing from the inside to the outside on at least one side, wherein the housing shells are arranged such that they are each connected to the connecting pin in order to secure them against being pushed apart relatively in an axial direction,
wherein the connection comprises at least one form fit formed by a separate locking element which is mounted on the connecting pin outside the booster housing, and
wherein the locking element is embodied as a sleeve which is fitted onto the connecting pin and is partially pressed into an axial undercut on the connecting pin.

* * * * *